United States Patent [19]

Forgione et al.

[11] Patent Number: 4,547,265
[45] Date of Patent: Oct. 15, 1985

[54] METHOD FOR SIZING PAPER USING HYDROLYZED HOMOPOLYMERS OR COPOLYMERS OF META- OR PARA-ISOPROPENYL-$\alpha,\alpha$-DIMETHYLBENZYLISOCYANATE

[75] Inventors: Peter S. Forgione; Balwant Singh; John A. Sedlak, all of Stamford, Conn.

[73] Assignee: American Cyanamid Company, Stamford, Conn.

[21] Appl. No.: 499,942

[22] Filed: Jun. 1, 1983

[51] Int. Cl.$^4$ ............................................. D21H 3/48
[52] U.S. Cl. ................................. 162/164.6; 162/135; 162/168.2
[58] Field of Search ................. 162/164.6, 135, 168.2; 526/310; 427/391

[56] References Cited

U.S. PATENT DOCUMENTS

| | | | |
|---|---|---|---|
| 2,606,892 | 8/1952 | Kropa et al. | 526/310 |
| 2,884,057 | 4/1959 | Wilson | 162/164.6 |
| 3,335,100 | 8/1967 | Geyer | 162/168.2 |
| 3,551,390 | 12/1970 | Krimm et al. | 526/310 |
| 4,234,381 | 11/1980 | Killam | 162/168.2 |

Primary Examiner—Peter Chin
Attorney, Agent, or Firm—Steven J. Hultquist; Gordon L. Hart

[57] ABSTRACT

A method of sizing paper, comprising applying thereto a sizingly effective amount of a polymer selected from the group consisting of:

(a) homopolymers of $\alpha,\alpha$-dimethyl-m-isopropenyl benzyl amine or $\alpha,\alpha$-dimethyl-p-isopropenyl benzyl amine;

(b) copolymers of (i) $\alpha,\alpha$-dimethyl-m-isopropenyl benzyl amine or $\alpha,\alpha$-dimethyl-p-isopropenyl benzylamine, and (ii) at least one other ethylenically unsaturated monomer copolymerizable therewith; and (c) acid salts of said homopolymers (a) and copolymers (b).

Such homopolymers or copolymers suitably may be prepared as the hydrolysis reaction products of the corresponding homopolymeric or copolymeric isocyanates.

12 Claims, No Drawings

METHOD FOR SIZING PAPER USING HYDROLYZED HOMOPOLYMERS OR COPOLYMERS OF META- OR PARA-ISOPROPENYL-α,α-DIMETHYLBENZYLISOCYANATE

This invention relates to a method of sizing paper and to novel sizing compositions therefor.

In the general practice of papermaking, an aqueous pulp suspension, or "furnish", of cellulosic fibers resulting from pulping of the feed wood stock is hydraulically and mechanically conveyed onto a wire grid or screen which is in motion to produce a wet web of cellulosic fibers. The wet fiber web is dewatered on the screen, by drainage of liquid therefrom, following which the wet web may be further treated, dried, calendered, and subjected to additional treatments as desired. Frequently, it is desirable to impart to the paper product resistant to penetration by liquids, particularly water. Sizing is the process of treating the paper with materials, called "sizes" which impart such liquid penetration resistance to the paper. Unsized or water leaf paper is highly absorbent to liquids and prone to liquid penetration. Accordingly, writing and wrapping papers are typically sizes, as contrasted to tissue and blotting paper which generally are not.

Numerous materials have been used in the prior art as sizing agents. These include rosin, various hydrocarbon and natural waxes, starches, glues, casein, asphalt emulsions, synthetic resins and cellulose derivatives.

In practice, the sizing material may be introduced to the papermaking system as a component of the furnish such that the sizing material permeates and coats the individual fibers which are subsequently formed into the paper web. Alternatively, the sizing agent may be applied to the product paper after same has been formed and dried, by spray or other application to the paper surface or immersion of the paper product in a solution. Such post-web formation is termed surface sizing, while the application of sizing agents to the feed stock fibers in the furnish is termed internal sizing.

It is an object of the present invention to provide an improved method of sizing paper, which imparts to the treated paper high resistance to liquid penetration.

It is another object of the present invention to provide a novel sizing composition for imparting high levels of liquid penetration resistance to paper.

These and other objects of the invention will become apparent from the ensuing disclosure and appended claims.

The present invention relates in one aspect to a method of sizing paper, comprising applying thereto a sizingly effective amount of a polymer selected from the group consisting of:

(a) homopolymers of meta- or para-isopropenyl-α,α-dimethylbenzylamine;

(b) copolymers of (i) meta- or para-isopropenyl-α,α-dimethylbenzylamine and (ii) at least one other ethylenically unsaturated monomer copolymerizable therewith; and (c) acid salts of said homopolymers (a) and copolymers (b).

The polymer employed in the sizing composition of the present invention suitably may constitute a hydrolysis reaction product of the corresponding homopolymeric or copolymeric isocyanate.

The homopolymers, copolymers and acid salts thereof employed in the sizing composition and method of the present invention are more fully described and claimed in copending U.S. Application Ser. No. 499,923 entitled "Meta- and Para-Isopropenyl-α,α-Dimethylbenzylamine" filed June 1, 1983 in the name of F. C. Schaefer.

As used herein, "meta-isopropenyl-α,α-dimethylbenzylamine" and "para-isopropenyl-α,α-dimethylbenzylamine" will be referred to as m-TMA and p-TMA, respectively. The corresponding isocyanate compounds meta-isopropenyl-α,α-dimethylbenzylisocyanate and para-isopropenyl-α,α-dimethylbenzylisocyanate will be referred to as m-TMI and p-TMI, respectively.

As indicated, the polymer employed in the sizing composition and method of the present invention suitably may comprise a copolymer of meta- or para-TMA and at least one other ethylenically unsaturated monomer copolymerizable therewith. Suitable co-monomers for such purpose include styrene: methyl styrene; p-methylstyrene; p-methyl-α-methylstyrene; ethylene; propylene; isobutylene; 1-butene; 1-pentene; 1-hexene; 1-octene; alkyl acrylates; alkyl methacrylates and halo-substituted ethylenes.

The polymer, viz., homopolymer of copolymer employed in the invention preferably is the hydrolysis reaction product of the corresponding homopolymeric or copolymeric isocyanate, meta- or para-TMI. The hydrolysis of the TMI homo- or copolymer to the corresponding TMA homo- or copolymer preferably is conducted at acid pH conditions. As disclosed in the aforementioned U.S. Patent Application Ser. No. 499,923, such hydrolysis may be carried out in an aqueous solution of acid such as hydrochloric acid, sulfuric acid, nitric acid, and acetic acid or any suitable mineral acid, to form the corresponding amine acid salt (e.g., hydrochloride, sulfate, nitrate, acetate, etc.).

The TMA acid salt compound prepared by such acid hydrolysis then may be treated with a suitably base, e.g., sodium hydroxide, to form the corresponding free amine compound. Either the free amine compound or the acid salt thereof my be employed in the broad practice of the present invention to good effect.

As used herein, "applying to the paper to be sized a sizingly effective amount of a polymer" is intended to be broadly construed to include both internal and surface sizing application of such polymer. Thus, the application to the paper to be sized of the polymer (homopolymer or copolymer of TMA, or acid salts thereof) may be effected by adding to the pulp furnish employed to make the paper a sizingly effective amount of the polymer, e.g. in the form of an aqueous acid salt solution or an aqueous emulsion of the free amine, such that the paper is thereby internally sized. Alternatively, the paper may be surface sized with a solution of the polymer, as for example by surface spray application of such solution of the free amine compound in an organic solvent or the acid salt in aqueous solution, or by immersion of the paper stock in a tub, vat or other reservoir of such polymer solution.

In preferred practice, the polymer employed in the method of the invention is a copolymer of from about 20 to about 80 mole percent meta- or para-TMA and from about 80 percent to about 20 mole percent of a comonomer selected from the group consisting of styrene, α-methyl styrene, p-methylstyrene and p-methyl-α-methylstyrene. Particularly preferred copolymers are copolymers of α-methylstyrene or styrene and meta- or para-TMA, as formed by acidic hydrolysis of the corresponding copolymers of styrene or α-methylstyrene and meta- or para-TMI.

In preferred practice, the TMA polymer (which is used herein refers to TMA homopolymers, copolymers and acid salts thereof) is applied to the paper in acid salt form in an aqueous solution containing e.g. from about 0.01% to about 3% by weight of the polymer. Such aqueous solution preferably has an acid pH, as for example on the order from about 2.0 to about 6.0.

The character of the invention is more fully illustrated by the following non-limiting examples hereinafter set forth wherein all parts and percentages are by weight, unless otherwise specified.

EXAMPLE I

Polymers of the hydrochloric acid salt of m-TMA, poly(m-TMA.HCl), were obtained by hydrolysis of poly(m-TMI) by the following procedures:

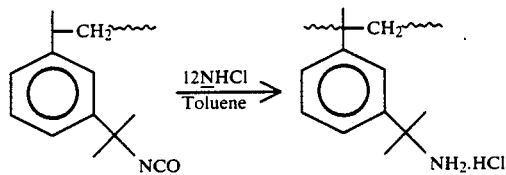

A mixture of 43 cc. of 12 N HCl (0.51 equiv.) and 400 cc. of toluene was preheated to 60° and with vigorous stirring 170 g. of 60.5% solution of poly-m-TMI (0.41 equiv.) in toluene was added in 75 min. The poly-m-TMI used in this experiment had a molecular weight range of 900–22000, peaking at 2900 (GPC analysis) and showed 3.99 meq-NCO/g. GLC analysis showed ~8% residual monomeric m-TMI. Carbon dioxide was evolved smoothly, and a granular suspension of the polyamine salt was produced. After another 90 minutes at 60°–65°, the mixture was cooled and filtered. The granular, very slightly caked solid was washed with toluene and with methylene chloride and was air-dried to constant weight. There was no aqueous phase in the filtrate. The produdt (108 g.) contained 7.2% water and on a dry basis showed C.E.Q. of 3.25; i.e. 3.25 meq. of amine per g. Total chloride was 4.31 meq/g. The IR spectrum showed evidence for a minor amount of urea structure, in line with the reduced amine content relative to the initial isocyanate content of the polymer. However, the principal cause of this decrease was removal of monomeric m-TMI as m-TMA.HCl (soluble in $CH_2Cl_2$/toluene).

In several similar preparations, up to a 10-fold excess of 12 N HCl was used. Even at this level essentially no polyamine hydrochloride dissolved although removal of impurities which are water-soluble probably resulted. If the reaction temperature was above ~70° C., the lower molecular weight polymers tended to form a gummy mass which greatly impeded hydrolysis and separation and purification of the desired product.

Poly-m-TMA.HCl was soluble in water to at least the 10% level although with high molecular weight material dissolution was quite slow. The TMA polymeric salt was readily soluble in wet acetone, which therefore could not be used to wash out the residual hydrochloric acid.

EXAMPLE II

The polyamine base poly(TMA) was prepared by treatment of the hydrochloride polymer obtained in Example I in water with excess NaOH and extraction with toluene or methylene chloride. The extract was dried over solid $K_2CO_3$ and evaporated to recover the polyamine as a syrup or glass, depending on its molecular weight. A typical polyamine prepared from 2900 peak M.W.-poly-m-TMI had 5.57% N (~3.98 meq/g.) and —$NH_2$ content of 4.03 meq/g by conventional analysis.

EXAMPLE III

A copolymer of TMA and α-methylstyrene was obtained by hydrolysis of a 70 mole % m-TMI/30 mole % α-methylstyrene copolymer by the following procedure.

Sixty-five grams of 70 mole % m-TMI/30 mole % α-methylstyrene copolymer were dissolved in 200 g. of anhydrous toluene and placed in a dropping funnel. During a ten minute period, the copolymer solution was added to 215 ml. of 12 N hydrochloric acid vigorously stirred in an 85° C. oil bath. Precipitation of white solid produced a thick mixture, which was stirred for an additional hour at 90°–95° C. and then rapidly cooled to room temperature.

The product was vacuum filtered to obtain moist, finely-divided white solid. After drying at 25° C./100 mm Hg, the solid weighed 125.3 g.

Sixty grams of the solid was shaken with a mixture of 100 ml. of water, 250 ml. of methylene chloride, and 38.4 g. of 33.3% sodium hydroxide solution. The solid dissolved in the methylene chloride to form a cloudy solution. The remaining 65 g. of solid was similarly treated.

The two solutions were combined, the methylene chloride was evaporated under vacuum, and the resulting solid was dried at 60° C./ 1 mm Hg to give 48.2 g. of off-white solid. The infrared spectrum of the product was indicative of m-TMA/ α-methylstyrene copolymer.

EXAMPLE IV

A series of separate copolymerization reaactions was run to produce 40% m-TMI/60% α-MeST, 50% m-TMI/50% α-MeST, and 70% m-TMI/30% α-MeST copolymers (percentages are mole percent; α-MeST-=α-methylstyrene) in methylene chloride solvent using $BF_3.Et_2O$ catalyst at −50° C., with "controlled addition" of α-MeST to the reaction volume containing m-TMI, catalyst and solvent. High conversion of monomers was achieved to yield copolymers of substantially homogeneous composition having peak molecular weights of 20,000 to 50,000.

EXAMPLE V

The copolymers of Example IV were hyrolyzed under acidic conditions (in excess hyrochloric acid aqueous solution ) to convert the isocyanate (—NCO) groups of the TMI copolymers to amino groups. Of the resulting hydrolyzed copolymers, the 30% α-MeST copolymer was completely soluble in aqueous acetic acid, whereas the 50% and 60% α-MeST copolymers were not so fully soluble.

EXAMPLE VI

The 70% m-isopropenyl-α,α-dimethylbenzylamine/30% α-MeST copolymer (hereinafter denoted TMA copolymer) of Example V (peak molecular weight of 27,000) was employed in quantitative tests for sizing of paper as compared with prior art conventional sizing compositions.

In the comparison, three grades of paper were used, all made from bleached pulp. These contained: (1) 10% calcium carbonate and 0.15% CYPRO 516 quaternary polyamine (American Cyanamid Company, Wayne, New Jersey) added; (2) waterleaf paper (no additives) and (3) 0.10% Alum added.

The TMA copolymer was dissolved at 0.18% and 0.093% concentrations in water containing, respectively, 0.5% and 0.25% acetic acid. The solutions were clear and colorless; pH 3. CYPRES 48, a conventional sizing resin (American Cyanamid Company, Wayne, New Jersey), was dissolved at 0.187% and 0.093% concentrations in water. The solutions were clear: pH 9 and 8, respectively.

The two solutions of each sizing agent were used to impregnate sheets of the three paper grades to dose 0.10% and 0.20% (based on weight of the paper) of the two sizes. The sheets were drum-dried at 105° C. for 1.5 minutes and post-cured in air at 105° for five minutes. Sizing evaluations were performed by means of a liquid penetration tester which employed photoelectric sensing. Water containing a green dye ("green water," pH 6.8) and TAPPI ink (pH 2.3) were used as test liquids. The results are summarized in Table I below.

TABLE I

| Size | Paper | Size Dosage, % | Penetration Time, Sec. Green Water | TAPPI Ink |
|---|---|---|---|---|
| TMA Copolymer | CaCO₃-filled | 0.10 | 2000+ | 423 |
|  |  | 0.20 | 2000+ | 597 |
|  | Waterleaf | 0.10 | 326 | 194 |
|  |  | 0.20 | 561 | 90 |
|  | Alum-treated | 0.10 | 689 | 3 |
|  |  | 0.20 | —* | —* |
| CYPRES 48 | CaCO₃-filled | 0.10 | 2 | 1 |
|  |  | 0.20 | 2 | 3 |
|  | Waterleaf | 0.10 | 4 | 3 |
|  |  | 0.20 | 2 | 3 |
|  | Alum-treated | 0.10 | 5 | 5 |
|  |  | 0.20 | 15 | 15 |

*Not tested.

These results show that the TMA copolymer was effective in yielding good sizing against water (pH, 6.8) and ink (pH, 2.3).

EXAMPLE VII

A 67 mole percent m-isopropenyl-α,α-dimethylbenzylamine/33 mole percent -MeST copolymer (hereinafter denoted TMA/ -MeST copolymer) (peak molecular weight of 20,000), a 24% m-isopropenyl-α,α-dimethylbenzylamine/76% styrene copolymer (hereinafter denoted TMA/ST copolymer), and a m- isopropenyl-α,α-dimethylbenzylamine homopolymer (hereinafter denoted TMA homopolymer) (peak molecular weight of 50,000 to 100,000) were employed in quantitative tests for sizing of paper.

In the tests, two grades of paper were used, both made from bleached pulp. These contained: (1) 10% calcium carbonate and 0.15% CYPRO 516 quaternary polyamine (American Cyanamid Co., Wayne, New Jersey) added; (2) waterleaf paper (no additives).

Each polymer was dissolved at 0.187% and 0.0935% concentrations in water containing respectively, 0.5% and 0.25% acetic acid. The pH of each solution was approximately 3.

The two solutions of each sizing agent were used to impregnate sheets of the two paper grades to doses 0.10% and 0.20% (based on weight of the paper) of the three sizes. The sheets were drum-dried at 105° C. for 1.5 minutes and post-cured in air at 105° C. for five minutes. Sizing evaluations were performed by means of a liquid penetration tester which employed photoelectric sensing. Water contains a green dye ("green water", pH 6.8) and TAPPI ink (pH 2.3) were used as test liquids. The results were summarized in Table II below.

TABLE II

| Size | Paper | Size Dosage % | Penetration Time, Sec. Green Water | TAPPI Ink |
|---|---|---|---|---|
| TMA/ -MeST Copolymer | CaCO₃-filled | 0.10 | 2000+ | 1118 |
|  |  | 0.20 | 2000+ | 1468 |
|  | Waterleaf | 0.10 | 442 | 402 |
|  |  | 0.20 | 544 | 608 |
| TMA/ST Copolymer | CACO₃-filled | 0.10 | 398 | 420 |
|  |  | 0.20 | 2000+ | 687 |
|  | Waterleaf | 0.10 | 156 | 226 |
|  |  | 0.20 | 382 | 951 |
| TMA Homopolymer | CaCO₃-filled | 0.10 | 1384 | 44 |
|  |  | 0.20 | 2000+ | 182 |
|  | Waterleaf | 0.10 | 76 | 2 |
|  |  | 0.20 | 250 | 7 |

What is claimed is:

1. A method of sizing paper, comprising applying thereto a sizingly effective amount of a polymer selected from the group consisting of:
   (a) homopolymers of meta- or para-isopropenyl-α,α-dimethylbenzylamine;
   (b) copolymers of (i) meta- or para-isopropenyl-α,α-dimethylbenzylamine and (ii) at least one other ethylenically unsaturated monomer copolymerizable therewith, wherein said copolymer contains at least one weight percent repeating units derived from the amine comonomer (i); and
   (c) acid salts of said hompolymers (a) and copolymers (b).

2. A method according to claim 1, wherein said polymer is the hydrolysis reaction product of the corresponding homopolymeric or copolymeric isocyanate.

3. A method according to claim 1 wherein said at least one other ethylenically unsaturated monomer (b) (ii) is selected from the group consisting of: styrene; methyl styrene; p-methylstyrene; p-methyl-α-methylstyrene; ethylene; propylene; isobutylene; 1-butene; 1,3-butadiene; 1-pentent; 1-hexene; 1,4-hexadiene; 1-octene; vinyl halides; vinylidene halides; vinyl acetate; vinyl benzoate; vinyl ketones; alkyl acrylates; alkyl methacrylates; alkacrylonitriles; and halo-substituted ethylenes.

4. A method according to claim 2 wherein hyrolysis is conducted at acid pH.

5. A method according to claim 1 wherein said polymer is added to a pulp furnish employed to make internally sized paper.

6. A method according to claim 1 wherein said paper is surface sized with an aqueous solution of said polymer.

7. A method according to claim 1 wherein said polymer is a copolymer of from about 20 to about 80 mole percent meta- or para-isopropenyl-$\alpha,\alpha$-dimethylbenzylamine and from about 80 to about 20 mole percent of a styrene comonomer selected from the group consisting of styrene, methyl styrene, p-methylstyrene, and p-methyl-$\alpha$-methylstyrene 8. A method according to claim 7 wherein said copolymer is formed by acidic hydrolysis of the corresponding copolymer of meta- or para-isopropenyl-$\alpha,\alpha$-dimethylbenzylisocyanate and $\alpha$-methyl styrene.

9. A method according to claim 7 wherein said copolymer is formed by acidic hydrolysis of the corresponding copolymers of meta- or para-isopropenyl-$\alpha,\alpha$-dimethylbenzyliosocyanate and styrene.

10. A method according to claim 1 wherein said polymer is applied to said paper in an aqueous solution containing from about 0.01% to about 3.0% by weight of said polymer.

11. A method according to claim 10 wherein said aqueous solution of said polymer has an acid pH.

12. A method according to claim 11 wherein said pH is from about 2.5 to about 6.5.

* * * * *